United States Patent [19]

Shiomi et al.

[11] Patent Number: 4,844,377
[45] Date of Patent: Jul. 4, 1989

[54] TAPE CASSETTE

[75] Inventors: Yoshinori Shiomi; Toshibumi Kamiyama, both of Tsuyama; Akihiro Nishimura, Osaka; Masao Kawagishi, Nara; Hideki Sakumoto; Masahiko Matsui, both of Osaka, all of Japan

[73] Assignee: Matsushita Electric Industrial Co., Ltd., Osaka, Japan

[21] Appl. No.: 178,993

[22] PCT Filed: Jul. 16, 1987

[86] PCT No.: PCT/JP87/00520
 § 371 Date: Mar. 7, 1988
 § 102(e) Date: Mar. 7, 1988

[87] PCT Pub. No.: WO88/00756
 PCT Pub. Date: Jan. 28, 1988

[30] Foreign Application Priority Data

Jul. 18, 1986 [JP] Japan ................................. 61-170121
Jul. 18, 1986 [JP] Japan ................................. 61-170122
Jul. 18, 1986 [JP] Japan ................................. 61-170123
Dec. 17, 1986 [JP] Japan ................................. 61-300973

[51] Int. Cl.4 ........................................... G11B 23/04
[52] U.S. Cl. .................................... 242/198; 242/199; 360/60; 360/132
[58] Field of Search ................................ 242/197–199; 360/60, 96.5, 96.6, 132, 137

[56] References Cited

U.S. PATENT DOCUMENTS 3,758,048 9/1973 Sugaya et al. ................... 242/198 X
4,536,812 8/1985 Oishi et al. ....................... 242/199 X
4,680,660 7/1987 Ueda ...................................... 360/132
4,757,399 7/1988 Peterson et al. ...................... 360/132

Primary Examiner—David Werner
Attorney, Agent, or Firm—Pollock, VandeSande & Priddy

[57] ABSTRACT

The present invention relates to a tape cassette suitable for VTRs which allows mounting of two kinds of tape cassettes whose outer dimensions are different from each other. The tape cassette has a front cover for covering a magnetic tape stretched in the front of a cassette body and a rear cover for covering the rear side of the magnetic tape, and the front edge of the upper surface of the rear cover is arranged to be normal to the upper surface of the cassette body so as to prevent error-insertion and to allow simple and sure insertion into a VTR and provide an excellent air-tightness, resulting in the prevention of image deterioration due to increase of drop out caused by entering of dust and so on.

9 Claims, 17 Drawing Sheets

TAPE CASSETTE

FIELD OF THE INVENTION

The present invention relates to a tape cassette employed, for example, for video tape recorders (which will hereinafter be referred to as VTR) and so on, and more particularly to such a tape cassette suitable for VTRs which allows loading of tape cassettes of two, large and small, classes (kinds) whose dimensions and mechanisms are respectively different from each other.

BACKGROUND OF THE INVENTION

Known hitherto as such a VTR system are ¾-inch VTRs and VHSVTRs and, in ¾-inch VTRs, in order to allow use of two, large and small, classes of cassettes, each of said cassettes is arranged to have guide channels so as to be guided to a predetermined position in a cassette garage. On the other hand, in VHSVTR cassettes, an adapter is attached to a smaller cassette so as to be used similarly to a larger cassette and the smaller cassette is guided to a predetermined position in a cassette garage.

Here, a prior arrangement of the VHSVTR system will be described with reference to FIGS. 18 through 24.

A structure of a VTR is illustrated in FIG. 18, in which numeral 1 represents a tape-cassette garage (which will hereinafter be referred to as cassette garage) for guiding insertion of a cassette. The cassette garage 1 has a frontage 2 whose dimension is slightly greater in length and height than that of the larger cassette and is provided with a pair of holes 3 and a projection 4 at its bottom surface 1a and equipped with a pair of cut-and-raised portions 5 at the front edge of its bottom surface 1a. In addition, the cassette garage 1 is arranged to be movable upwardly and downwardly by means of a sliding mechanism, not shown. On the other hand, below the cassette garage 1 are provided a pair of reel bases 7 which are fixed on a bedplate 6 and which are rotated by means of a motor, not shown, so that the reel bases 7 are fitted in the holes 3 in response to downward movement of the cassette garage 1.

FIG. 19 is an illustration of a structure of a large cassette 8. The body 9 of the large cassette 8 is made up by engagement and fastening of an upper case 9a and a lower case 9b and encases a pair of tape reels 10. At the front face of the cassette body 9 is defined an opening portion 11 and along the opening portion 11 is stretched a magnetic tape (not shown) wound around the tape reels 10. Numeral 12 is an opened and closed cover provided rotatably with respect to the case body 9 for covering from the outside the magnetic tape (not shown) stretched along the opening portion 11. At a substantial center portion of the opened and closed cover 12 is provided a recess 13 for prevention of a reverse-insertion and, when as shown in FIG. 20 the large cassette 8 is inserted with the upper portion and lower portion thereof being reversed, the projection 4 and the recess 13 come into contact with each other so as to prevent the insertion in advance. Numeral 14 represents a guide channel provided at the bottom surface of the cassette body 9 and numeral 15 designates a safety lug. FIG. 21 shows a structure of a small cassette 16. The body 17 of the small cassette 16 is made up with engagement and fastening of an upper case 17a and a lower case 17b and encases a pair of tape reels 18, 19. On the periphery of a lower flange 19a of the tape reel 19 are formed teeth 20 which are exposed from a side surface of the cassette body 17. Numeral 21 is an opened and closed cover provided on the case body 17 for covering a magnetic tape (not shown) wound around the tape reels 18 and 19 from the front side.

FIG. 22 illustrates the structure of a cassette adapter 22, whose outer dimension is equal to that of the large cassette 8, for encasing the small cassette 16. The cassette adapter 22 has the same outer dimension as the large cassette 8 and, at the left side, has a space 23 for encasing the small cassette 16. In the space 23 are provided arms 25 each of which has a guide roller 24 planted at one end portion thereof for stretching the magnetic tape (not shown) wound around the reels 18, 19 up to the same position as in the case of the large cassette. Numeral 26 depicts a guide channel. Numeral 27 represents an opened and closed cover for holding the inserted small cassette 16 by depression from the upper side, the arms 25 being automatically operated in response to closing of the opened and closed cover 27. On the other hand, at the right side thereof is provided a rotatable first rotating body 28 whose configuration is substantially similar to that of the reel 10 of the large cassette 8. On the periphery of a flange 28a of the first rotating body 28 are formed teeth (not shown) which are in turn engaged with second and third rotating bodies 29 and 30 which have respectively teeth similar to those of the first rotating body 28 and which are arranged rotatably, the third rotating body 30 being exposed into the space 23. Numeral 31 is an opened and closed cover provided so as to cover the stretched magnetic tape (not shown) from the front side, and at a substantial center portion of the opened and closed cover 31 is provided a recess 32 for prevention of error-insertion. Numeral 33 is a safety lug.

With respect to the above-mentioned arrangement, a description of the case of initially mounting the large cassette 8 will be made with reference to FIG. 23. In FIG. 23, the large cassette 8 is moved in a direction indicated by an arrow with the opened and closed cover 12 being advanced and, in response to reaching the inside of the frontage 2, is guided and inserted by means of the engagement of the guide channel 14 with both side surfaces 1b, 1c and projection 4 of the cassette garage 1. Termination of the insertion thereof into the cassette garage 1 is made by coming into contact with the cut-and-raised portions 5. Thereafter, the entire cassette garage 1 is moved downwardly whereby the reel bases 7 are inserted into the holes 3 to be engaged with the reels 10, resulting in the recording and reproducing state. Second, a description of the case of mounting the small cassette 16 will be made with reference to FIG. 24. Here, the description of the process after the mounting on the cassette garage 1 will be omitted because it is the same as in the case of the mounting of the large cassette 8. In FIG. 24, the opened and closed cover 21 of the small cassette 16 is first full-opened and then encased in the reception space 23 of the cassette adapter 22 so that the opened and closed cover 21 of the small cassette 16 and the opened and closed cover 12 of the cassette adapter 22 are directed to same direction. After encased, the opened and closed cover 27 of the adapter 22 is set to the closed state. With the above processes it results in the same use state as the large cassette and the recording and reproducing can be made in accordance with the same procedure as the mounting of the large cassette.

However, in the above-described arrangement, an exclusive use adapter is required for use of the small cassette and the provision of the adapter results in cost-increase and further results in being troublesome in operation. In addition, the structure of the small cassette itself results in poor airtightness because it is required that a portion of teeth is exposed due to the relation between the adapter and drive means, and the poor tightness allows insertion of dust therefrom and causes increase of drop out, deterioration of the image quality and so on. Therefore, the above-mentioned large and small cassette system is not adequate.

DISCLOSURE OF THE INVENTION

The present invention, from the viewpoint of elimination of the above-mentioned problems, contemplates to provide a tape cassette suitable for large and small cassette systems in which the mounting on the same VTR can be performed without provision of the adapter, the upside-down insertion can be obviated and an excellent airtightness is provided for the small cassette.

An arrangement of the present invention comprises a cassette body constructed of upper and lower cases for encasing a pair of reels around which a magnetic tape is wound, a front cover for covering the magnetic tape stretched in the front of the cassette body and a rear cover for covering the rear side of the magnetic tape and the front edge of the upper surface of the rear cover is arranged to be normal to the upper surface of the cassette body, thereby allowing prevention of error-insertion, simple and sure mounting on VTR or the like, provision of excellent airtightness, and deterioration of image quality due to increase of drop out caused by entering of dust and so on.

MOST PREFERRED EMBODIMENT OF THE INVENTION

Figure 1:
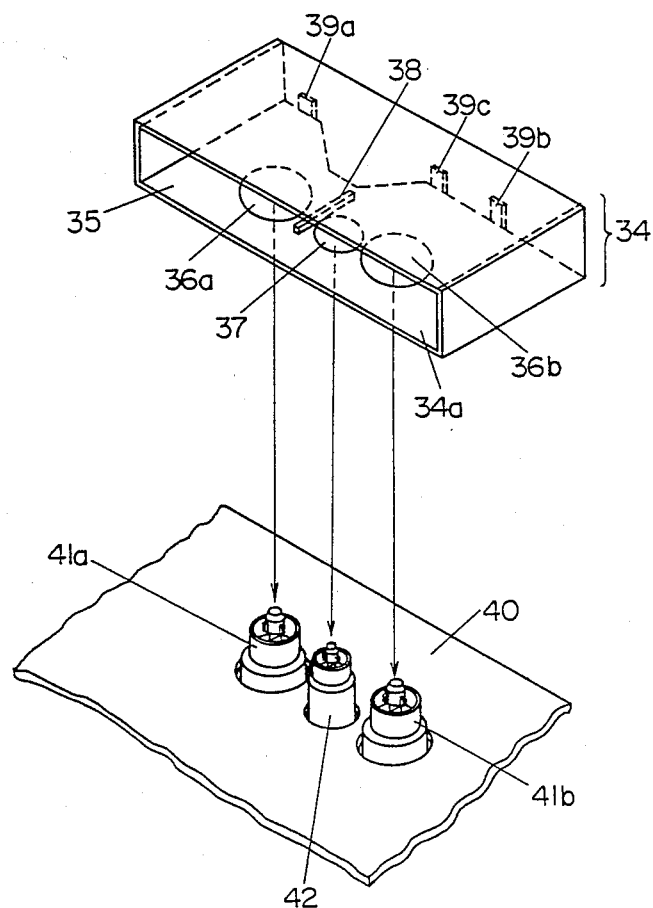
FIGS. 1 and 2 are perspective views showing one example of VTRs used for the present invention.
Figure 2:
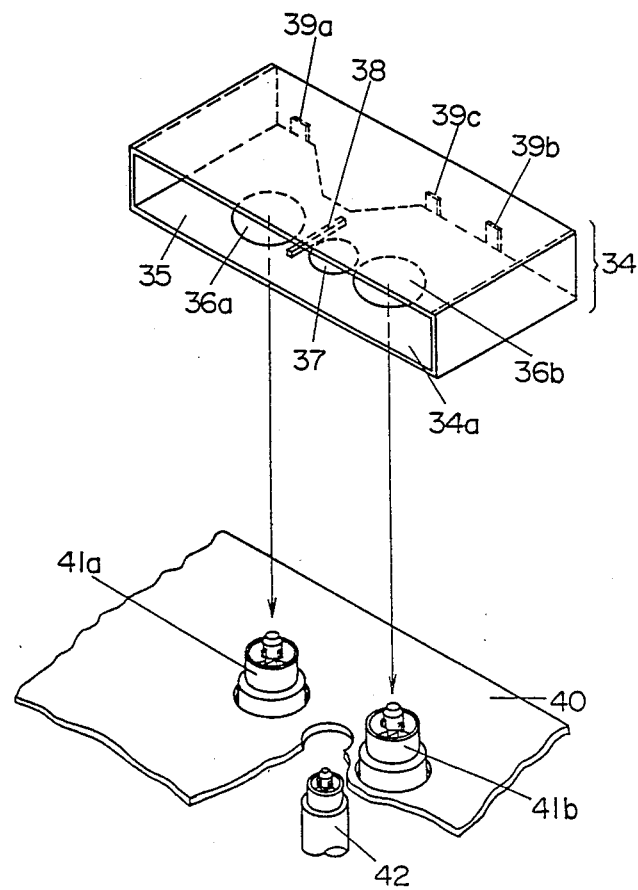

An embodiment of the present invention will be described hereinbelow with reference to FIGS. 1 through 17. In FIG. 1 showing a VTR structure of the embodiment of this invention, numeral 34 represents a cassette garage for guiding insertion of a cassette and the cassette garage 34 has a frontage 35, whose dimension is slightly greater in longitudinal length and height than that of a larger cassette, and further has a pair of holes 36a and 36b and a hole 37 on its bottom surface, the hole 37 being positioned between the pair of holes 36a and 36b and having a diameter slightly smaller than that of the pair of holes 36a and 36b. In addition, a projection 38 is provided between the holes 36a and 37. Furthermore, on the front edge of the bottom surface 34a are provided cut-and-raised portions 39a, 39b and 39c. On the cut-and-raised portion 39b is provided a micro switch (not shown) which is arranged to be operatively associated with an up-and-down moving mechanism of a reel base 42 which will be described hereinafter. The cassette garage 34 is arranged to be movable upwardly and downwardly by means of a sliding mechanism (not shown). On the other hand, below the cassette garage 34 is provided a pair of reel bases 41a and 41b, secured on a bedplate 40 and rotated by means of a motor (not shown), and a reel base 42, positioned between the pair of reel bases 41a and 41b and arranged to be movable upwardly and downwardly and rotatable by means of a motor (not shown). In response to downward movement of the cassette garage 34 the holes 36a, 36b and 37 are resepctively engaged with the reel bases 41a, 41b and 42. FIG. 1 shows a normal state that the reel base 42 has been moved upwardly and FIG. 2 illustrates the state that the reel base 42 has been moved downwardly.

Figure 3:
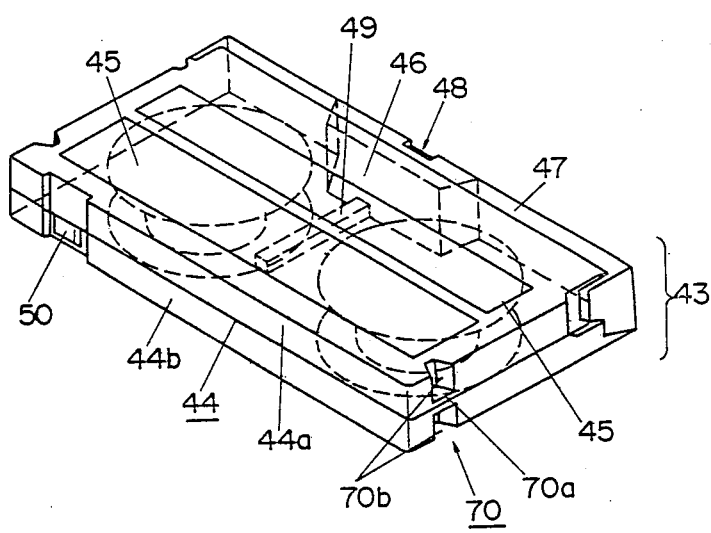
FIG. 3 is a perspective view illustrating an embodiment of large cassettes.
Figure 4:
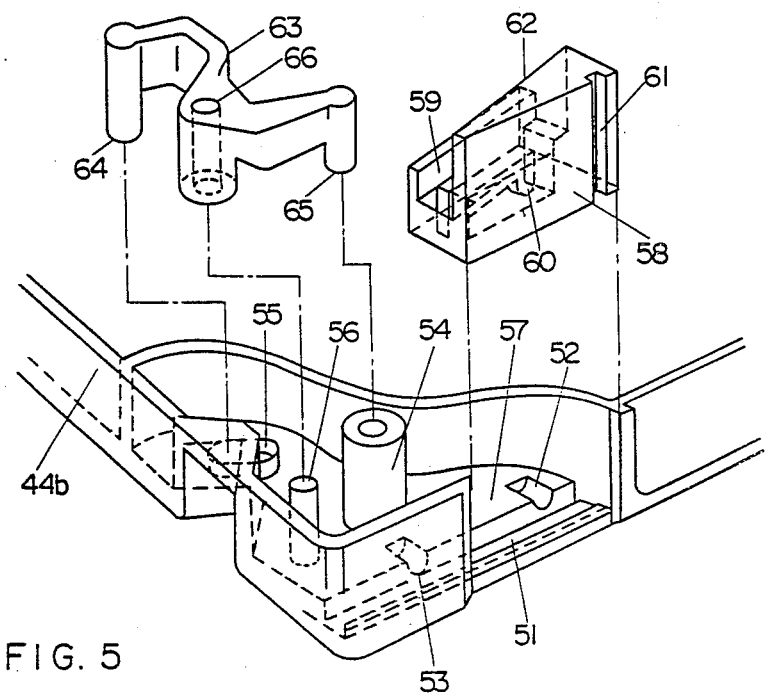
FIG. 4 is an exploded perspective view showing a structure of a safety lug of the large cassette.
Figure 5:
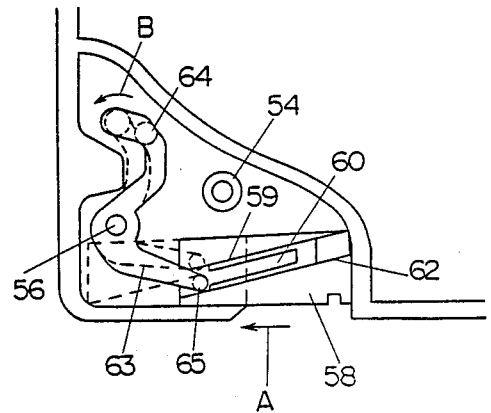
FIG. 5 is a plane view for describing operation of the safety lug of the large cassette.
Figure 6:
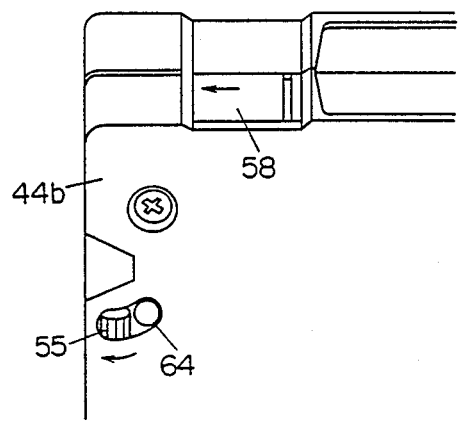
FIG. 6 is a perspective view showing the principal portion of the safety lug structure.

FIG. 3 is an illustration of a structure of a large cassette 43 used in the embodiment of the present invention. The large cassette 43 has a structure substantially similar to that of the large cassette 8 in the above-mentioned conventional example and therefore a description of parts corresponding to those of the large cassette 8 will be omitted and a description will be made in terms of only the different parts therefrom. In FIG. 3, a cassette body 44, an upper case 44a, a lower case 44b, tape reels 45, an opening portion 46, an opened and closed cover 47, a recess 48 and a guide channel 49 respectively correspond to the cassette body 9, upper case 9a, lower case 9b, tape reels 10, opening portion 11, opened and closed cover 12, recess 13 and guide channel 14. Numeral 50 represents an error-erase prevention portion, the arrangement thereof being as illustrated in FIG. 4. In FIG. 4, numeral 44b is the above-mentioned lower case, numeral 51 is a channel defined in the error-elimination prevention portion 50, numeral 52 represents a first recess, numeral 53 designates a second recess, numeral 54 depicts screw hole for combination of the upper and lower cases, numeral 55 represents an error-erase detection hole opened at the lower surface of the lower case 44b, numeral 56 is a boss, numeral 57 designates an opening portion of the error-elimination prevention portion, numeral 58 depicts a first part for the error-erase prevention, numeral 59 is a channel, numeral 60 is a tongue-like piece for elasticity, numeral 61 is a hooking portion for operation, numeral 62 represents an inclined surface, numeral 63 designates a second part for the error-erase prevention, numeral 64 is a detection portion, numeral 65 is a boss, and numeral 66 is a rotation hole. The first part 58 for the error-erase prevention is received in the channel 51 and can be slid along the channel with the hooking portion 61 being engaged with a hook. The second part 63 for the error-erase prevention is rotatable with the boss 56 being fitted in the rotation hole 66, and the boss 65 is engaged with the channel 59 and the detection portion 64 is fitted in the error-erase detection hole 55 so as to be exposed from the lower surface of the case. In FIG. 5, when the first part 58 for the error-erase prevention is slid in the direction indicated by an arrow A, since the channel 59 has the inclined surface 62, the boss 65 is moved along this surface and the detection portion 64 is rotated in the direction indicated by an arrow B, whereby the opening portion 57 is present at the error-erase prevention portion and, because of movement of the detection portion 64, an opening portion is also presented at the lower surface side of the case. The tongue-like piece 60 for elasticity, for sure positioning, is fitted in the recess 52 when the first part 58 for error-erase prevention is positioned at the opening portion 57 and fitted in the recess 53 when the opening portion 57 is in the opened state. FIG. 6 is an illustration viewed from the lower case.

Figure 7:
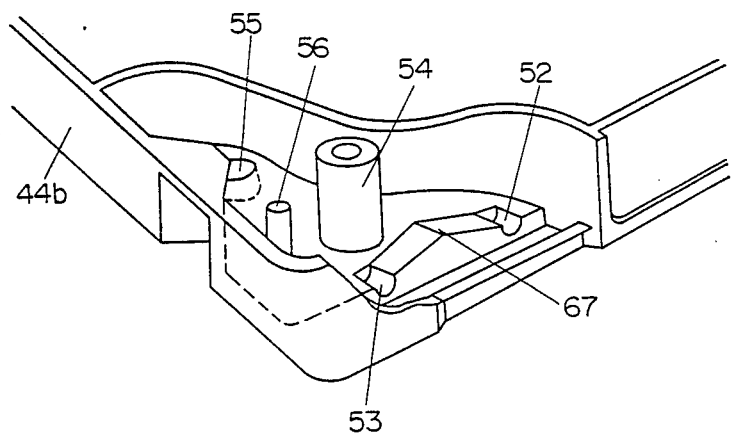
FIG. 7 is a perspective view showing another safety lug structure of the large cassette.

FIG. 7 shows another embodiment in which a convexed portion 67 is arranged between the first and second recesses 52 and 53 of the lower case 44b. According to the error-erase prevention portion arranged thus, the tongue-like piece 60 should go over the convexed portion 67 when transferred between the first and second recesses 52 and 53 and therefore clicks can be obtained in response to movement of the first part 58 for error-erase prevention portion and the first part 58 is not stopped on the way, thus resulting in sure movement with high reliability. On the basis of the movements of the first part 58 and second part 63 for error-erase prevention, for example, at the video deck side (not shown), at the side surface and lower surface of the case, the allowance of recording can be judged when the opening becomes absent and the non-allowance of the recording can be decided in response to presence of the opening.

Figure 8:
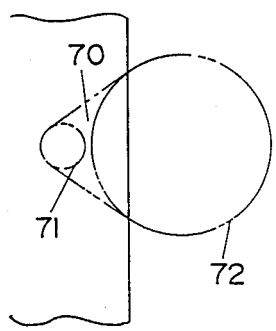
FIG. 8 is a plane view of the main portion showing an operating diagram when an automatic changing device of the small cassette is used.
Figure 9:
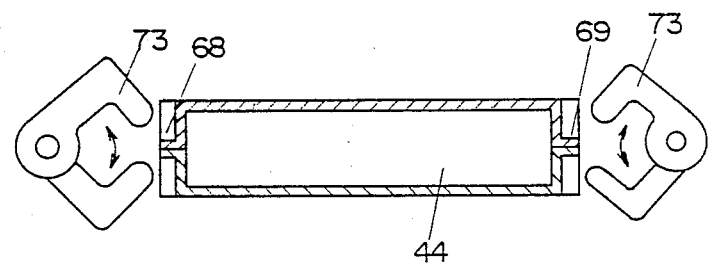
FIG. 9 is a cross-sectional view of the main portion.

Numeral 68 represents an automatic changing device and so on provided at both the side surfaces of the cassette body 44 and a gripping portion used at the time of insertion and discharge of the large cassette 43. The gripping portion 68 comprises gripping rack portions and substantially V-shaped recess 70 and the gripping rack portions are positioned at substantial center portions whereby distinguishing can become easy irrespective of viewing from either upper side or lower side of the large cassette. Furthermore, with the above-mentioned arrangement, since as shown in FIG. 8 the recess portion 70 is substantially V-shaped, when the cassette body 44 is gripped from the sides having the gripping portions 68, it is possible to surely grip it even if the end configuration of the gripping portion is varied in size as indicated by circles 71 or 72. On the other hand, even in the case that the cassette body 44 is gripped from the upper and lower sides, as shown in FIG. 9, it is also possible that handling lugs 73 can easily and surely grip the gripping rack portions 69. The configuration of the large cassette is equal to that of the small cassette and therefore the gripping thereof can be made similarly.

Figure 10:
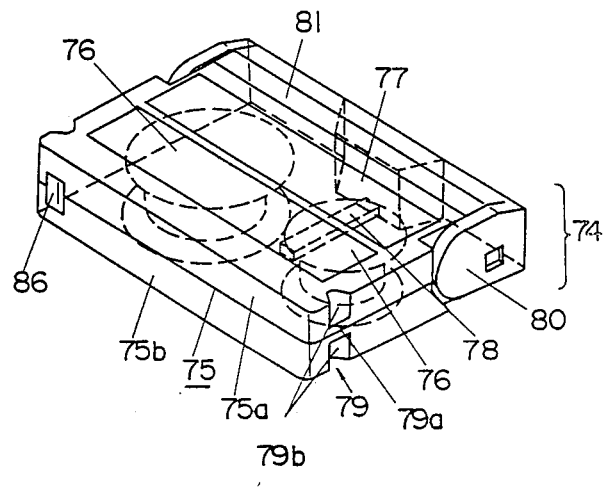
FIG. 10 is a perspective view showing an embodiment of the small cassette.
Figure 11:
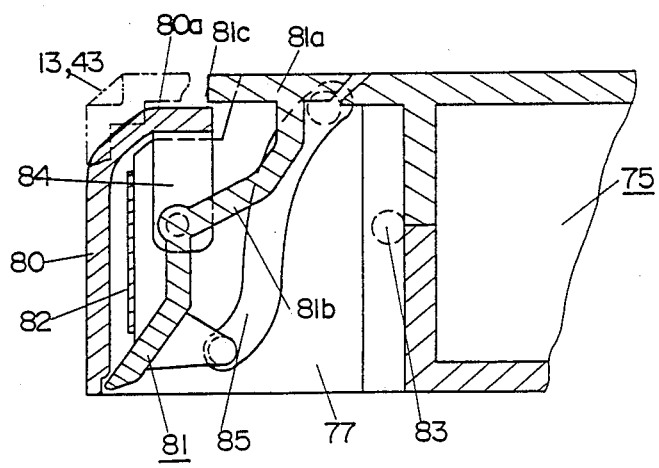
FIG. 11 is a cross-sectional view of the front main portion of the small cassette.
Figure 12:
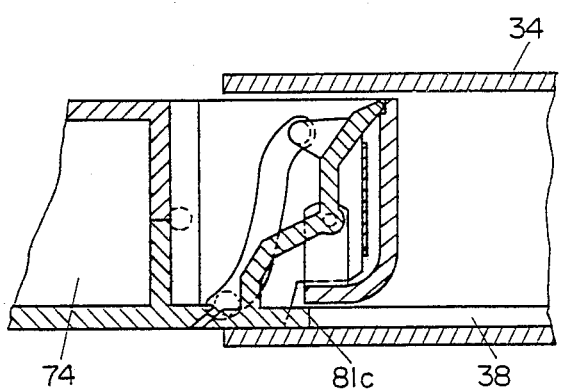
FIG. 12 is a cross-sectional view of the main portion for describing the inserting operation of the small cassette.
Figure 13:
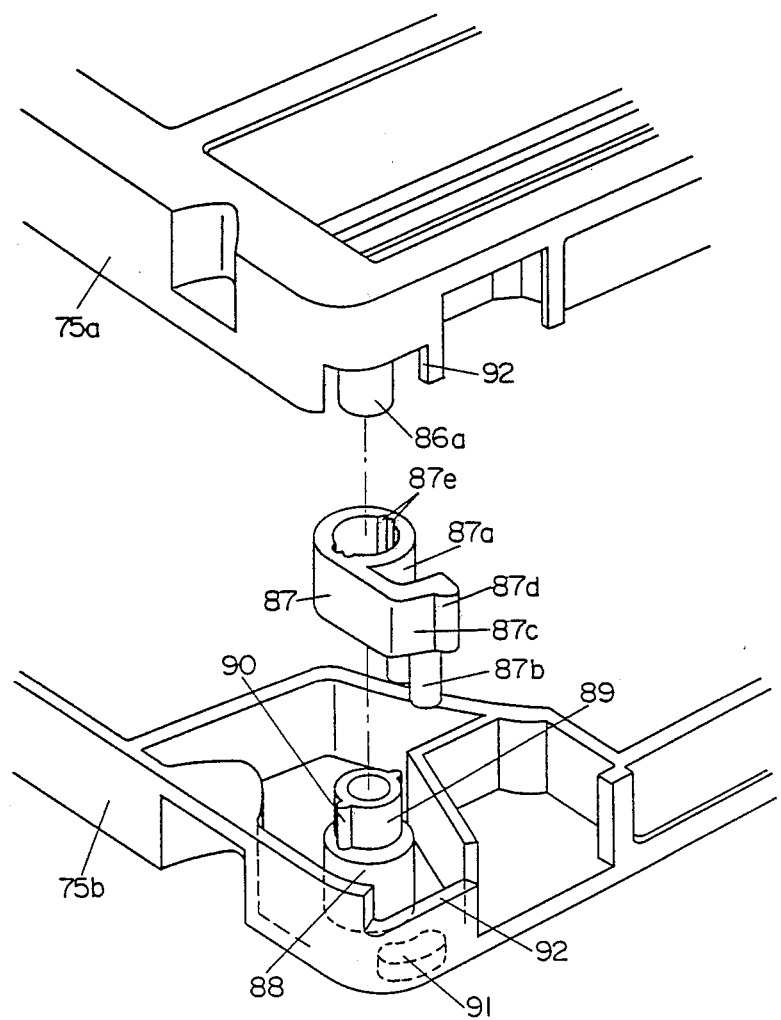
FIG. 13 is an exploded perspective view showing a structure of prevention of error-erase of the small cassette.
Figure 14:
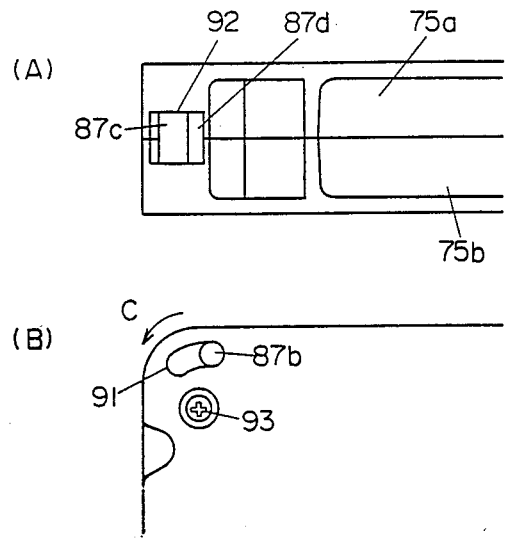
FIGS. 14A and 15A are plane views for describing operation of the error-erase prevention of the small cassette.
FIGS. 14B and 15B are bottom views thereof.
Figure 15:
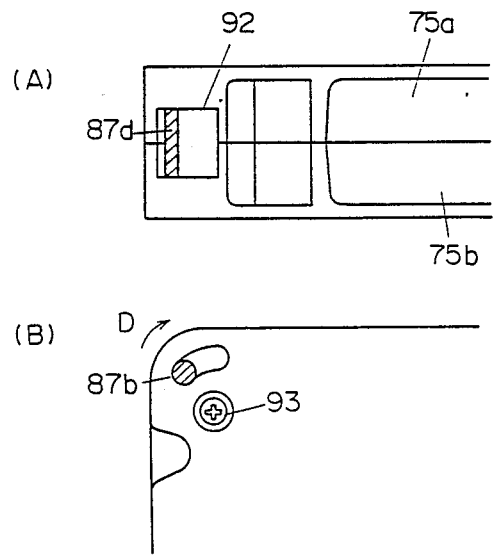

FIG. 10 shows a structure of the small cassette 74 used in the embodiment of the present invention. In FIG. 10, a detailed description of parts corresponding to the large cassette will be omitted irrespective of difference of the size and a description will be made in terms of parts different therefrom. In FIG. 10, a cassette body 75, an upper case 75a, a lower case 75b, tape reels 76, an opening portion 77, an opened and closed cover 78, gripping portions 79, gripping rack portions 79a, and recess portions 79b respectively correspond to the cassette body 44, upper case 44a, lower case 44b, tape reels 45, opening portion 46, opened and closed cover 47, gripping portions 68, gripping rack portions 69 and recess 70. Numeral 80 represents a front cover and numeral 81 a rear cover and these structures are illustrated in FIG. 11. FIG. 11 is a front side main portion cross-sectional view of the small cassette 74, and the front cover 80 is a cover for covering, from the front side, a magnetic tape 82 stretched along the opening portion 77 and is pivotally supported by the cassette body 75 to be rotatable about a shaft 83. The rear cover 81 is substantially T-shaped and comprises a top surface portion 81a for covering the magnetic tape 82 from the up side and a rear surface portion 81b for covering it from the rear side and is rotatably pivoted by a rib 84 provided on the front cover 80 and guided slidingly along a guide channel 85 provided in the cassette body 75. The magnetic tape is sealed for protection from dust by closing the front and rear covers 80 and 81. However, in such an arrangement, the reverse-insertion prevention recess 13 of the large cassette 8 in the above-mentioned conventional one or the reverse-insertion prevention recess 48 of the large cassette 43 in the above-mentioned embodiment is positioned above the top surface portion 80a of the front cover 80 and hence the recess 13 or 48 cannot be provided on the front cover 80. Therefore, an end portion 81c of the top surface portion 81a of the rear cover 81 is arranged to be a surface which is flat and at right angles to the top surface portion 81a so that, when as shown in FIG. 12 the upside-down insertion of the small cassette 74 is made into the cassette garage 34, the projection 38 is brought into contact with the end portion 81c so as to prevent the insertion. Numeral 86 is an error-erase prevention portion whose structure is arranged as illustrated in FIG. 13. In FIG. 13, numeral 75a represents an upper case, numeral 86a designates an upper case boss, numeral 87 depicts an error-erase prevention member, numeral 87a is a cylindrical portion, numeral 87b is an error-erase detection portion, numeral 87c is an indication portion, numeral 87d is a convexed portion for operation, numeral 87e is a concaved portion for positioning, numeral 75b is a lower case, numeral 88 is a lower case boss, numeral 89 is an error-erase prevention piece engaging portion, numeral 90 is a convexed portion for positioning, and numeral 91 represents an error-erase detection hole. The cylindrical portion 87a is fitted in the error-erase prevention member engaging portion 89 of the lower case boss 88 whereby the error-erase prevention member 87 is rotatable thereabout, and the error-erase detection portion 87b is fitted in the error-erase detection hole 91 of the lower case and exposed on the same plane. The upper case boss 86a is engaged with the lower case boss 88 after being passed through the error-erase prevention member 87 and the upper case 75a is coupled to the lower case 75b by means of a screw 93 shown in FIG. 14. The operation convexed portion 87d and indication portion 87c of the error-erase prevention member 87 are exposed from notches 92 provided on the upper and lower cases to the outside and hence the operating convexed portion 87d can be easily operated by means of a hook or the like. FIGS. 14 and 15 show the rotationally operated state of the error-erase prevention member 87. For example, in FIG. 14, in the case that recording is allowed under the condition that the indication portion 87c is protruded from the notch 92, a judgment is made in the deck (not shown) side in that the error-erase detection portion 87b is absent at the error-erase detection hole 91 of the lower surface of the case, resulting in allowance of recording. Furthermore, when the error-erase prevention member 87 is rotated in the direction indicated by an arrow C, as shown in FIG. 14, the indication portion 87c disappears and a decision is made in that the error-erase detection portion 87b is transferred from the error-erase detection hole 91 of the half lower case 75b up to a position allowed to be detected by the deck side, resulting in inhibition of recording. The error-erase prevention member 87 again returns to the original position in response to rotation in the direction indicated by an arrow D and hence the operation can be repeatedly made. The positioning concaved portions 87e are engaged with the positioning convexed portions 90 and the position of each of the positioning concaved portions 87e provided in two steps corresponds to the state shown in FIGS. 14 and 15 so whereby the error-erase prevention member 87 can be rotated with an operating force over a predetermined degree. If the error-erase prevention member 87 is printed so as to be different in color from the cassette body 75, the distinguishing of the member 87 therefrom becomes easier.

Figure 16:
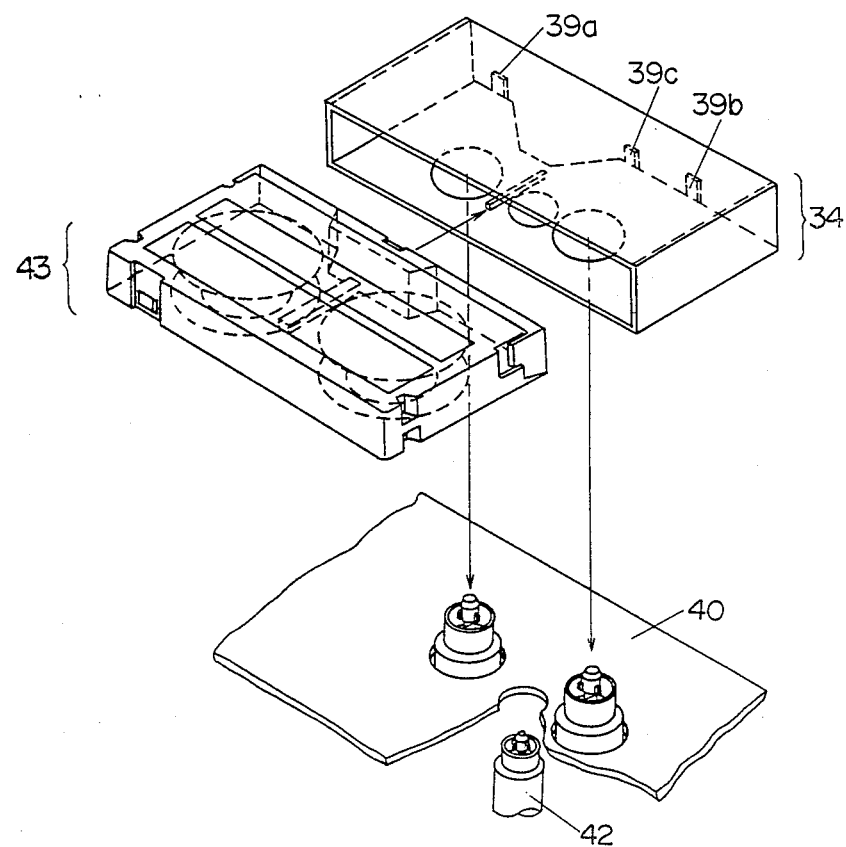
FIG. 16 is a perspective view showing mounting operation of the large cassette on a VTR.

In the above-mentioned arrangement, a description of the case of initially mounting the large cassette 43 will be made with reference to FIG. 16. Because the operation is similar to that of the above-mentioned conventional one, a description will be made in terms of only the different parts. In FIG. 16, in response to the large cassette 43 being inserted into the cassette garage 34, it comes into contact with the cut-and-raised portions 39a, 39b and 39c provided at the front edge of the bottom surface 34a of the cassette garage 34 to cause termination of mounting on the cassette garage 34. At this time, the micro switch (not shown) attached to the cut-and-raised portion 39b is depressed and the reel base 42 is moved downwardly to below the bedplate 40 and hence the large cassette 43 is in the driven state. Thereafter, the operations are made as well as in the conventional one, resulting in the recording or reproducing state.

Figure 17:
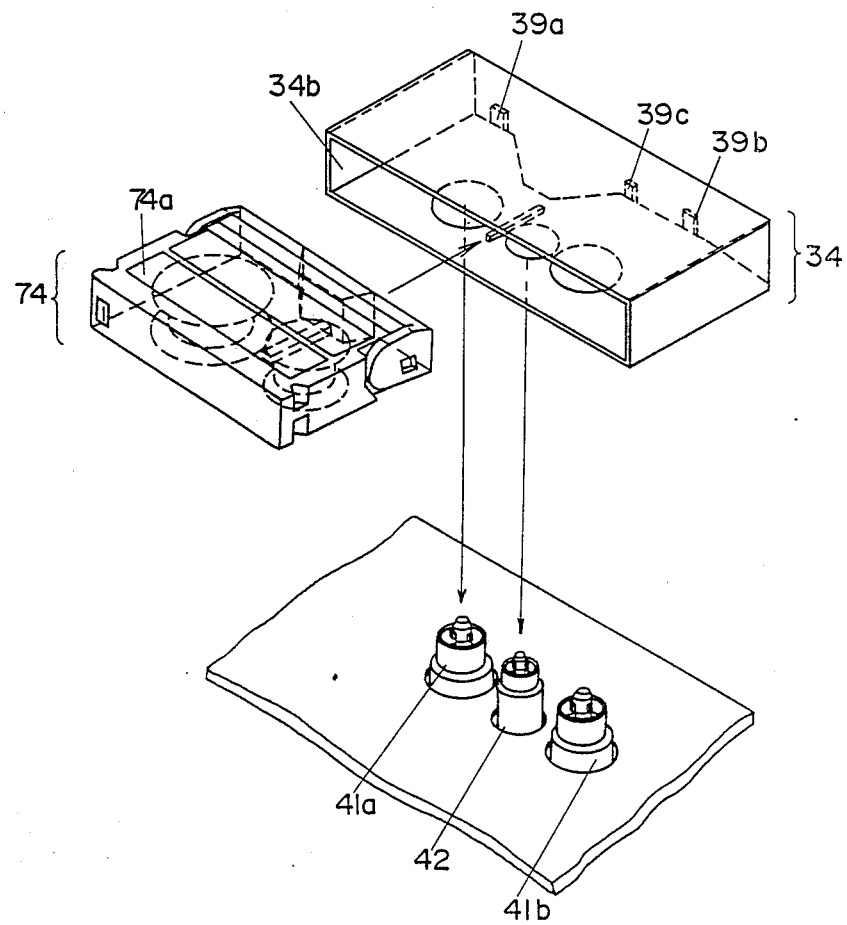
FIG. 17 is a perspective view showing a mounting operation of the small cassette on VTR.
Figure 18:
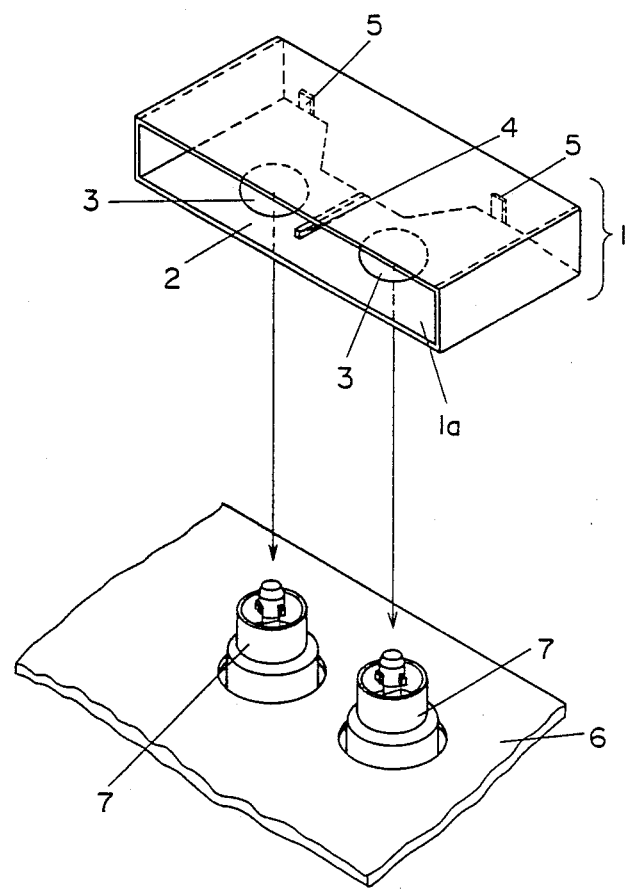
FIG. 18 is a perspective view of a conventional VTR.
Figure 19:
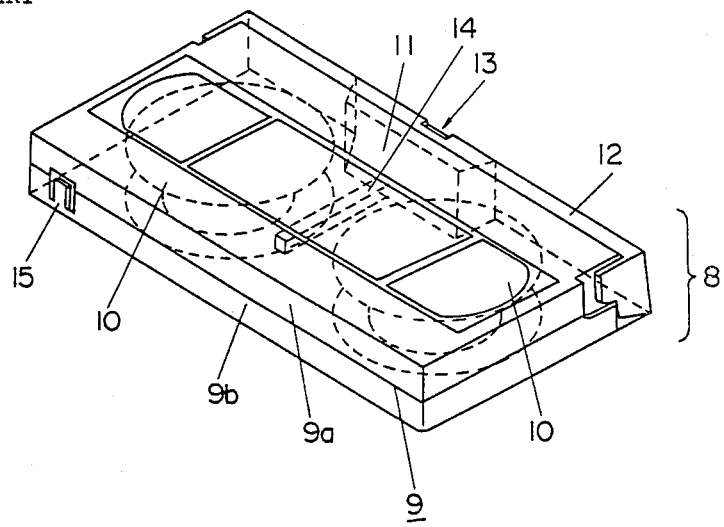
FIG. 19 is a perspective view showing a large cassette therein.
Figure 20:
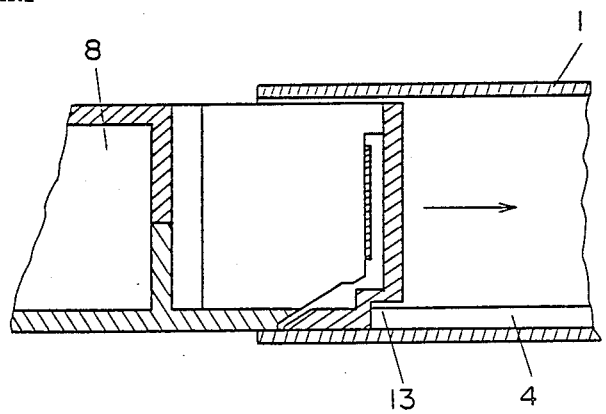
FIG. 20 is a cross-sectional view of the main portion for operation of the large cassette.
Figure 21:
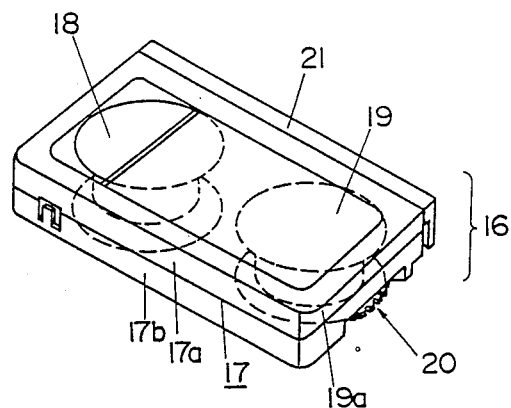
FIG. 21 is a perspective view of a small cassette therein.
Figure 22:
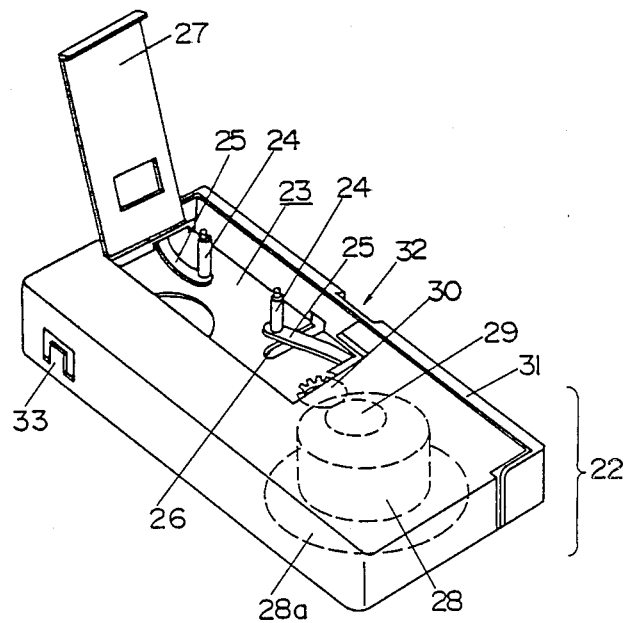
FIG. 22 is a perspective view of an adapter therein.
Figure 23:
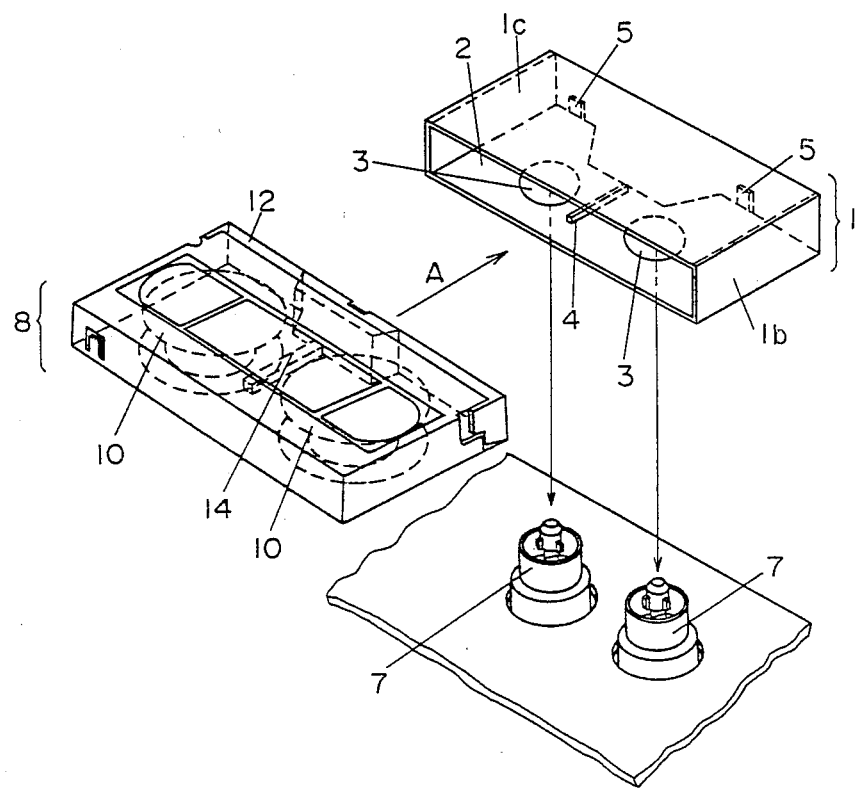
FIG. 23 is a perspective view showing mounting operation of the large cassette on a VTR.
Figure 24:
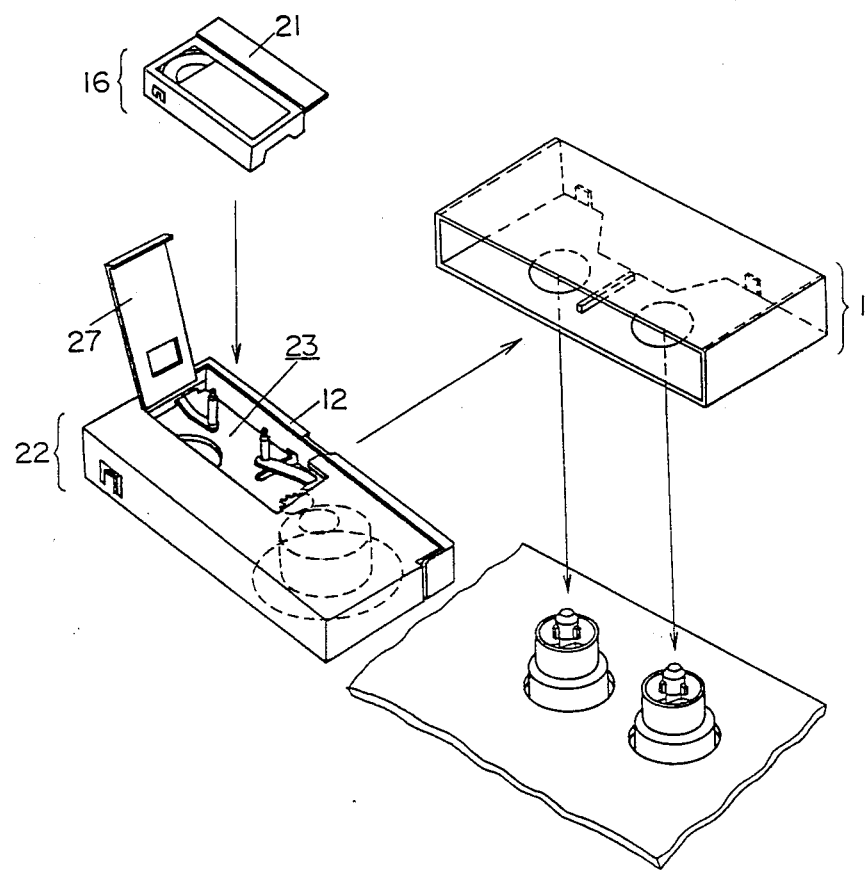
FIG. 24 is a perspective view showing mounting operation of the small cassette on the VTR.

Furthermore, a description of the case of mounting the small cassette 74 will be described hereinbelow with reference to FIG. 17. The description for the operations will be made in terms of only the different parts as well as in the large cassette 43. In FIG. 17, the insertion of the small cassette 74 into the cassette garage 34 is made with the left side surface 74a of the small cassette 74 being guided by the left side surface 34b of the cassette garage 34. The insertion thereof is terminated when reaching the cut-and-raised portions 39a, 39b and 39c. At this time, the cut-and-raised portion 39b of them does not come into contact with the small cassette 74 and therefore the micro switch (not shown) provided thereon is not operated so that the reel base 42 is not moved downwardly and is in the same position relative to the reel bases 41a and 41b. Thereafter, the operation is made as well as in the conventional one so that it is driven by means of the reel bases 41a and 41b to be set to the recording or reproducing state.

INDUSTRIAL UTILIZATION

As described above, according to this invention, provided are a front cover for covering a magnetic tape stretched in the front of a cassette body and a rear cover for covering the rear side of the magnetic tape. The front edge of the upper surface of the rear cover is formed to be at right angles to the upper surface of the cassette body whereby even in the case that the two kinds of cassettes whose outer dimensions are different from each other are mounted on a VTR, the mounting can be easily and surely achieved without the complex treatments in the conventional one and further excellent airtightness is provided particularly for the small cassette so as to resolve the problem of deteriorating the image quality due to increase of drop out caused by entering of dust and so on, resulting in a great effect.

We claim:

1. A tape cassette arranged to be mounted on a magnetic recording/reproducing apparatus having a cassette compartment into which said tape cassette is inserted and which has on its bottom surface a projection, comprising:
    a cassette body constructed by an upper case half and a lower case half which are integrally combined up and down with each other to encase a pair of reels around which a magnetic tape is wound and which are arranged to form an opening at a front surface of said cassette body in the combination so that a portion of said magnetic tape stretched between said pair of reels is exposed at said opening of said cassette body;
    a front cover for covering the exposed magnetic tape portion from the front side thereof, said front cover being pivotally supported by a portion of said cassette body to be rotatably openable and closable about a supporting portion thereof; and
    a rear cover for covering the exposed magnetic tape portion from the upper side and the rear side thereof, said rear cover being slidably movable with respect to the exposed magnetic tape portion and having an upper covering portion, a front end surface of said upper covering portion of said rear cover being arranged to be normal to a main surface of said upper covering portion thereof so as to come into contact with said projection of said cassette compartment when said tape cassette is inserted reversely into said cassette compartment to prevent said tape cassette from being inserted thereinto.

2. A tape cassette as claimed in claim 1, wherein said cassette body has gripping portions at both outside surfaces which are in opposed relation to each other, each of said gripping portions comprising substantially V-shaped recess portions and a rack portion interposed therebetween so that said rack portion is gripped through said substantially V-shaped recess portions from both sides.

3. A tape cassette as claimed in claim 1, further comprising an integrated member comprising a cylindrical portion rotatably engaged with a boss for coupling said upper and lower case halves of said cassette body at an opening portion of a back surface of said cassette body and an error-erase detection portion exposed from a bottom surface of said cassette body through a hole provided at the bottom surface thereof, and indication and detection relating to error-erase being effected by means of the rotation.

4. A tape cassette as claimed in claim 3, wherein positioning for rotation is made by means of a combination of a convexed portion and concaved portion respectively provided on said cylindrical portion and said boss.

5. A tape cassette as claimed in claim 3, wherein a convexed portion is provided on an indication portion of said integrated member.

6. A tape cassette as claimed in claim 3, wherein a color of said integrated member is different from that of the cassette half.

7. A tape cassette as claimed in claim 1, wherein said cassette body has gripping portions at both outside surfaces which are in opposed relation to each other, each of said gripping portions comprising substantially V-shaped recess portions and a rack portion interposed therebetween so that said rack portion is gripped through said substantially V-shaped recess portions from both sides.

8. A tape cassette comprising:

a cassette body constructed by an upper case half and a lower case half which are integrally combined to encase a pair of reels around which a magnetic tape is wound and which are arranged to form front-side and rear-side openings at front and rear surfaces of said cassette body in the combination, a portion of said magnetic tape stretched between said pair of reels being exposed at said front-side opening of said cassette body;

front-side cover means for covering the exposed magnetic tape portion from the front side of said cassette body, said front cover means being supported by a portion of said cassette body to be rotatably openable and closable; and rear-side cover means slidably movable along a bottom surface of said lower case half so as to open and close said rear-side opening of said cassette body, said rear-side cover means being engaged with one end portion of a rotating member which is rotatable about its substantially center portion, the other end portion thereof being adapted to be exposed from a hole formed in said bottom surface of said lower case half when said rear-like cover means is kept in the closed condition and to be rotated within said hole of said bottom surface in accordance with the opening movement of said rear-side cover means.

9. A tape cassette as claimed in claim 8, wherein a raised portion is provided on said bottom surface of the lower case half and engaged with an elastic tongue-like piece attached to said rear-side cover means when said rear-side cover means is slidably opened or closed.

* * * * *